United States Patent
Bell

(10) Patent No.: US 8,001,332 B2
(45) Date of Patent: Aug. 16, 2011

(54) ADAPTIVE CACHING FOR HIGH VOLUME EXTRACT TRANSFORM LOAD PROCESS

(75) Inventor: Trevor Bell, Mission Viejo, CA (US)

(73) Assignee: Siemens Aktiengesellschaft, Munich (DE)

(*) Notice: Subject to any disclaimer, the term of this patent is extended or adjusted under 35 U.S.C. 154(b) by 344 days.

(21) Appl. No.: 12/402,313

(22) Filed: Mar. 11, 2009

(65) Prior Publication Data
US 2009/0276577 A1      Nov. 5, 2009

Related U.S. Application Data

(60) Provisional application No. 61/049,300, filed on Apr. 30, 2008.

(51) Int. Cl.
*G06F 12/00* (2006.01)
(52) U.S. Cl. ........................................................ 711/137
(58) Field of Classification Search .................. None
See application file for complete search history.

(56) References Cited

U.S. PATENT DOCUMENTS

| | | | |
|---|---|---|---|
| 6,490,652 B1 | 12/2002 | Van Hook et al. | |
| 6,564,300 B2 * | 5/2003 | Chang | 711/143 |
| 6,895,471 B1 | 5/2005 | Tse et al. | |
| 7,644,234 B2 * | 1/2010 | Sasaki et al. | 711/128 |

OTHER PUBLICATIONS

Barian Jarrett, "Perl ETL: Surrogate Key Lookup Caching", Sep. 17, 2007, XP-002536189, [download Sep. 7, 2009], download from Internet URL: http://www.brianjarrett.com/2007/09/17/perl-etl-surrogate-key-look ..., 3pgs.

* cited by examiner

*Primary Examiner* — Hiep Nguyen
(74) *Attorney, Agent, or Firm* — Buckley, Maschoff & Talwalkar LLC

(57) ABSTRACT

A method, system, and medium related to a mechanism to cache key-value pairs of a lookup process during an extract transform load process of a manufacturing execution system. The method includes preloading a cache with a subset of a set of key-value pairs stored in source data; receiving a request of a key-value pair; determining whether the requested key-value pair is in the preloaded cache; retrieving the requested key-value pair from the preloaded cache if the requested key-value pair is in the preloaded cache; queuing the requested key-value pair in an internal data structure if the requested key-value pair is not in the preloaded cache until a threshold number of accumulated requested key-value pairs are queued in the internal data structure; and executing a query of the source data for all of the accumulated requested key-value pairs.

20 Claims, 3 Drawing Sheets

ADAPTIVE CACHING FOR HIGH VOLUME EXTRACT TRANSFORM LOAD PROCESS

CROSS-REFERENCE TO RELATED APPLICATION

This application claims the benefit of U.S. Provisional Patent Application Ser. No. 61/049,300, filed Apr. 30, 2008, entitled "ADAPTIVE CACHING FOR HIGH VOLUME EXTRACT TRANSFORM LOAD PROCESSES, which is incorporated herein in its entirety.

BACKGROUND

Embodiments may generally relate to methods and systems of an extract transform load process. More particularly, some embodiments are concerned with providing efficient adaptive caching for high volume extract transform load (ETL) processes.

An ETL process may be used to move data from one or more databases, transform the data, and load the transformed data into one or more different databases. The ETL process may be done for a variety of purposes, including, for example, analytics, improving reporting query performance, and data aggregation. A Manufacturing Execution System (MES) is a software system that may be used to control production activities in a factory environment. MES applications may be used to support, for example, real-time production control and data collection and reporting.

In some instances, one feature of ETL processes in a MES environment may be a requirement to look up a value based on a "key", including retrieving a natural key given a foreign key. As used herein, a key is a value that uniquely identifies something or is otherwise associated with another entity. For example, a person's social security number may be a key to identify a complete record profile of an individual in a database. In this manner, a query using keys may be executed against the database to retrieve records specified in the query. The process of retrieving values based on keys may happen many times for each inbound row in an ETL process, resulting in frequent database accesses to look up the key-value pairs.

It is not uncommon for an ETL process to invoke millions of key-value pair lookups. In an ETL process where millions of rows are processed, each lookup may result in a database access. Given that source databases may typically be distributed on or over remote computers, each database access may incur the overhead of a network roundtrip that may have dramatic negative effects on the overall speed of the ETL process.

As such, there exists a need for a system, method, and computer executable program that facilitates efficient ETL processing.

SUMMARY

Some embodiments provide a system, method, device, program code and/or means for method for caching values during an extract transform load (ETL) process in a manufacturing execution system (MES). The method may include preloading a cache with a subset of a set of key-value pairs stored in source data, with a goal of achieving at least a predetermined cache hit ratio for any request of a particular key-value pair among the set stored in the source data; receiving a request of a key-value pair; determining whether the requested key-value pair is in the preloaded cache; retrieving the requested key-value from the preloaded cache if the requested key-value pair is in the preloaded cache; queuing the requested key-value pair in an internal data structure, if the requested key-value pair is not in the preloaded cache, until a threshold number of accumulated requested key-value pairs are queued in the internal data structure; and executing, in response to the internal data structure queue meeting the threshold number of accumulated requested key-value pairs, a query of the source data for all of the accumulated requested key-value pairs, and a command to retrieve all of the accumulated requested key-value pairs from the source data.

A system according to embodiments herein may include a first database; and an extract transform load (ETL) process of a manufacturing execution system (MES) to extract data from the first database, perform a transformation of the extracted data, and load the transformed data into the second database. The ETL process may operate to preload a cache of the MES with a subset of a set of key-value pairs stored in source data of the first database, with the goal of achieving at least a predetermined cache hit ratio for any request of a particular key-value pair among the set stored in the source data; receive a request for a key-value pair; determine whether the requested key-value pair is in the preloaded cache; retrieve the requested key-value from the preloaded cache if the requested key-value pair is in the preloaded cache; queue the requested key-value pair in an internal data structure of the MES, if the requested key-value pair is not in the preloaded cache, until a threshold number of accumulated requested key-value pairs are queued in the internal data structure; and execute, in response to the internal data structure queue meeting the threshold number of accumulated requested key-value pairs, a query of the source data of the first database for all of the accumulated requested key-value pairs, and a command to retrieve all of the accumulated requested key-value pairs from the source data.

In some embodiments, a medium having machine executable program instructions stored thereon that may be executed to implement the methods and systems disclosed herein.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION OF SPECIFIC EMBODIMENTS

Figure 1:
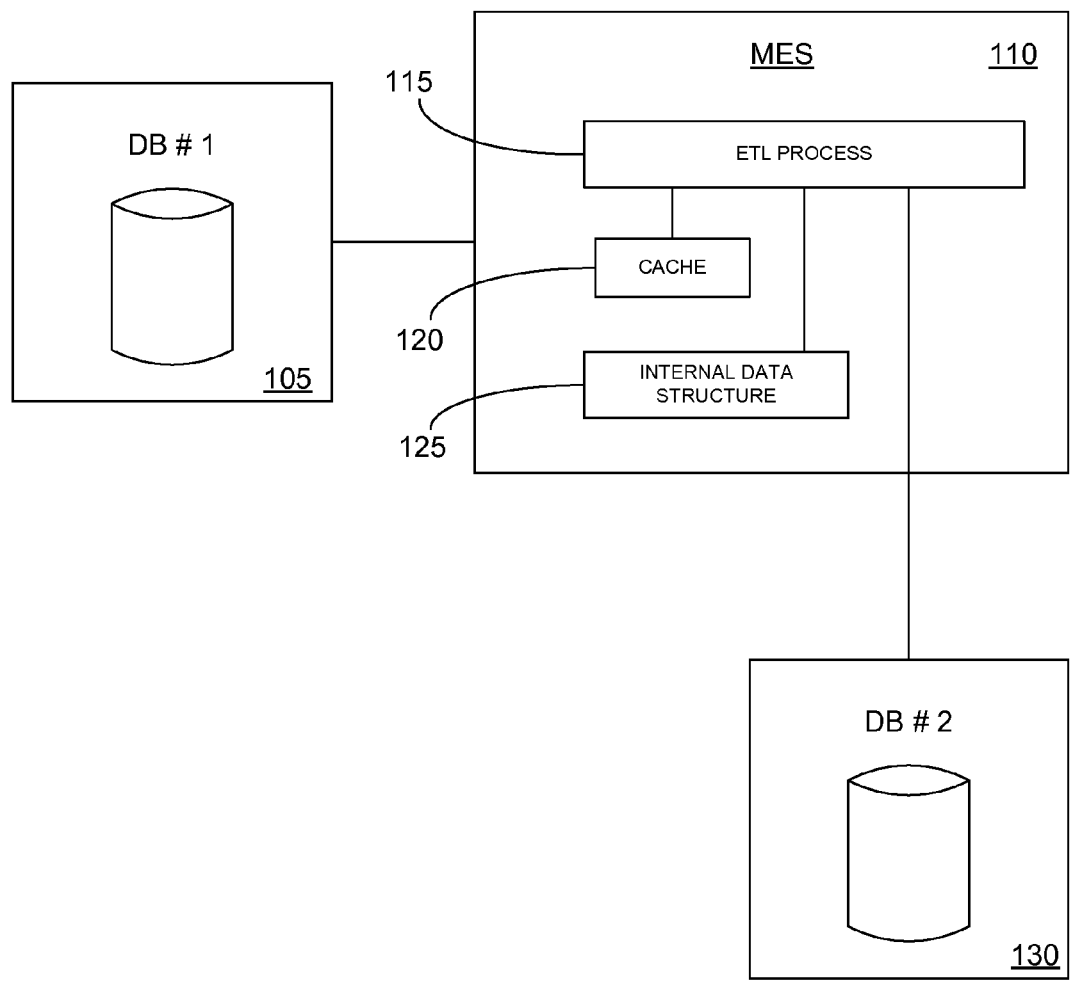
FIG. 1 is a flow diagram of a process, according to some embodiments.

FIG. 1 is an illustrative block diagram of system 100, according to some embodiments herein. System 100 includes an ETL process 115 in a manufacturing execution system (MES) environment 110. The ETL process may be used to extract data from a first database 105, transform the extracted data, and load the transformed data into one or more different databases such as database 130. An aspect of ETL process 115 may be a requirement to look up a value based on a key. The process of looking up a value based on some specified key may be invoked many, many times for each inbound row of the ETL process. Thus, database 105 may be accessed each time a value is to be retrieved to satisfy the lookup.

Cache 120 may be provided to store data that may be frequently used by ETL process 115. Accessing and retrieving data from cache 120 for use by ETL process 115 may alleviate the need to frequently access a database (e.g., 105). In some embodiments, accessing data from cache 120, often local to MES 110 and ETL 115, is faster and more efficient than accessing and retrieving the same data from a database. In some instances, databases are remotely located and must be accessed via one or more communication networks.

In some embodiments, system 100 may preload (i.e., charge) cache 120 with a subset of data from a source data store such as, for example, database 105. Cache 120 may be preloaded with a set (or sub-set) of data from a database (e.g., database 105) with a goal of achieving a predetermined cache hit ratio. The target predetermined cache hit ratio may be at least 50% in some embodiments. In other embodiments, the predetermined cache hit ratio may be set to 80%. In some embodiments, the set or sub-set of data from the database may be refined, altered, or modified in the instance the target goal hit rate is not initially achieved, maintained, or consistently achieved.

System 100 may also include an internal data structure 125. Internal data structure 125 may be provided for queuing "misses" when a data request against cache 120 results in a miss. Instead of accessing database 105 in response to a cache miss, the cache miss may be stored, logged, warehoused, or otherwise queued in internal data structure 125 until a predetermined number of misses are accumulated. Upon accumulating the predetermined number of misses in a queue maintained in internal data structure 125, a query for all of the values associated with the misses in the queue may be executed against database 105. In this manner, instead of executing numerous, separate database accesses, a single query for all of a predetermined number of data values may be executed to access the database one time.

In some embodiments, the predetermined number of misses to accumulate in a queue maintained by internal data structure 125 may be set or established to be at least 100. It is noted that the predetermined number of misses to accumulate in the queue may be set to other values, either greater than or less than the example of 100. In some embodiments, the predetermined number may be established, determined, or calculated based on a function of the size of the cache, the particular ETL process, the efficiency of database 105, and other factors.

In some instances, a lookup source table may have upwards of millions of rows of key-value pairs. Accordingly, some embodiments herein may limit the number of rows that may be stored in a cache. That is, cache 120 may be limited in size and configured with a memory limit beyond which the cache cannot be increased.

In some embodiments, methods and systems herein may seek to store the most frequently used data (e.g., key-value pairs) in the system cache. For example, as the cache reaches its storage limit, a least used row may be removed to accommodate a new row of data. In this manner, the systems and methods herein may operate to enhance the hit rate of the cache.

Figure 2:
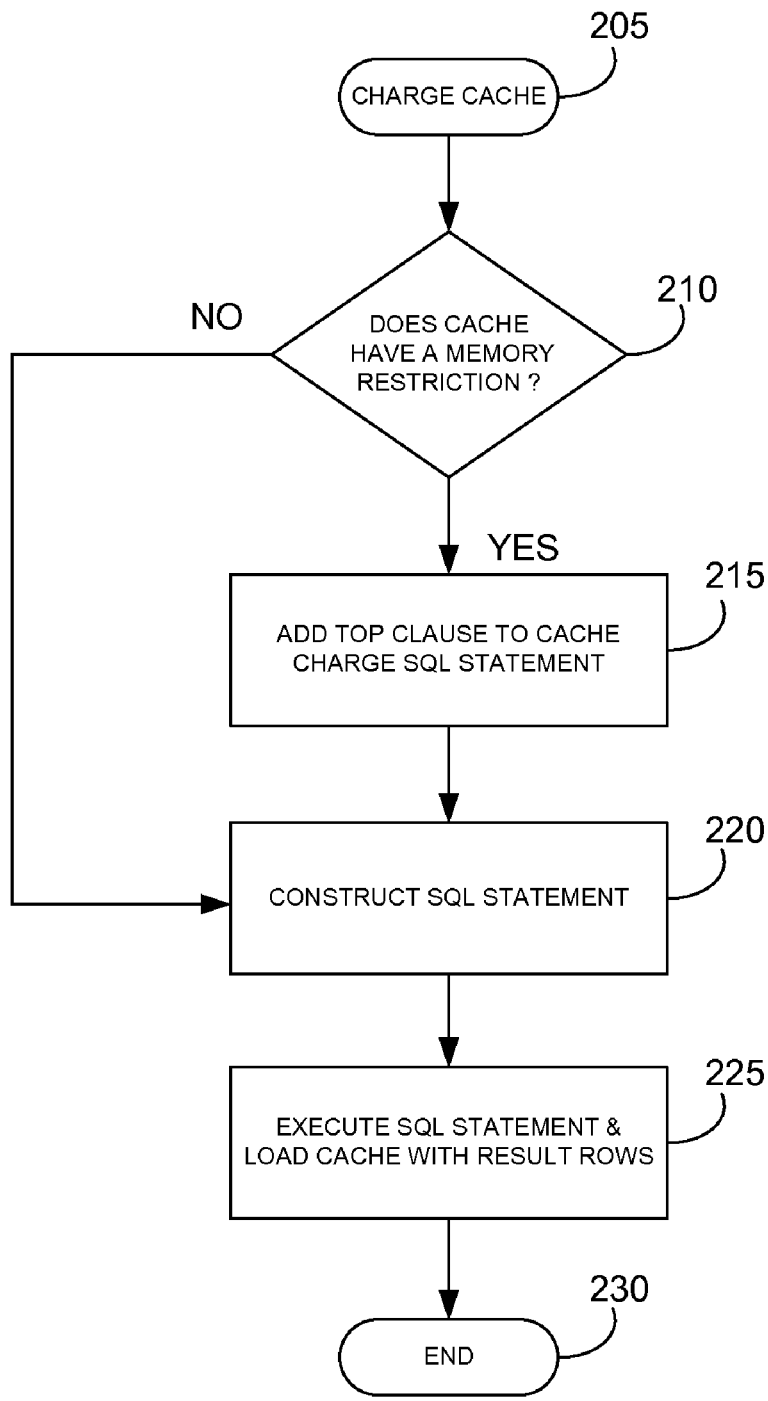
FIG. 2 is a flow diagram of a process, according to some embodiments.

FIG. 2 is a flow diagram for a process 200 to initialize cache 120 before ETL process 115 for MES 110 begins. At operation 205, cache 120 is preloaded or charged with an initial set of key-value pairs. The preloading or charging of the cache may be implemented in some instances using a SQL statement provided by a developer.

It is determined at 210 whether cache 120 has a memory restriction. In some embodiments there may be a restriction or limit on the size of the cache that limits the maximum number of rows that can be cached. A two-step process may be used to calculate the maximum number of rows that can be cached according to some embodiments. In a first step, a maximum possible width of the cached data row is calculated. In a second step, the maximum bytes available for the cache may be divided by the result value of the first step. The result of the second step is the maximum number of rows that may be stored in the cache.

At operation 215, the calculated value may be used to insert a SQL TOP clause to the SQL caching statement. The TOP clause operates to limit the number of rows that can be returned from executing the SQL query statement. This query is then executed, and the resulting rows are loaded into a hash table (or other data construct) stored in memory. If the cache does not have a memory restriction, then the SQL statement is constructed at 220 and then executed at 225.

The SQL statement is constructed at operation 220, whether the size of the cache is restricted or does not have a size restriction. Process 200 proceeds to operation 225 to execute the SQL query statement that operates to load the cache. In some embodiments, the resulting rows of data used to preload the cache may be loaded into a hash table in the cache. The cache preloading or charging process 200 terminates at operation 230.

As mentioned above, embodiments herein may seek to have a target or goal hit ratio of about 50% to about 80% for the preloaded or charged cache. That is, the cache may not be configured to have, achieve, or approach a 100% successful hit ratio. In some embodiments, another or second query statement may be specified to allow ETL 115 a second opportunity to perform an exact lookup for the desired data in the instance there was an initial cache miss. As used herein, this second chance query is referred to as a second chance SQL query. In some instances, cache misses may be batched in sets of 100 (or some other predetermined number of cache misses) and the second-chance SQL query is executed for the batched set of misses to retrieve the corresponding rows from a database.

Figure 3:
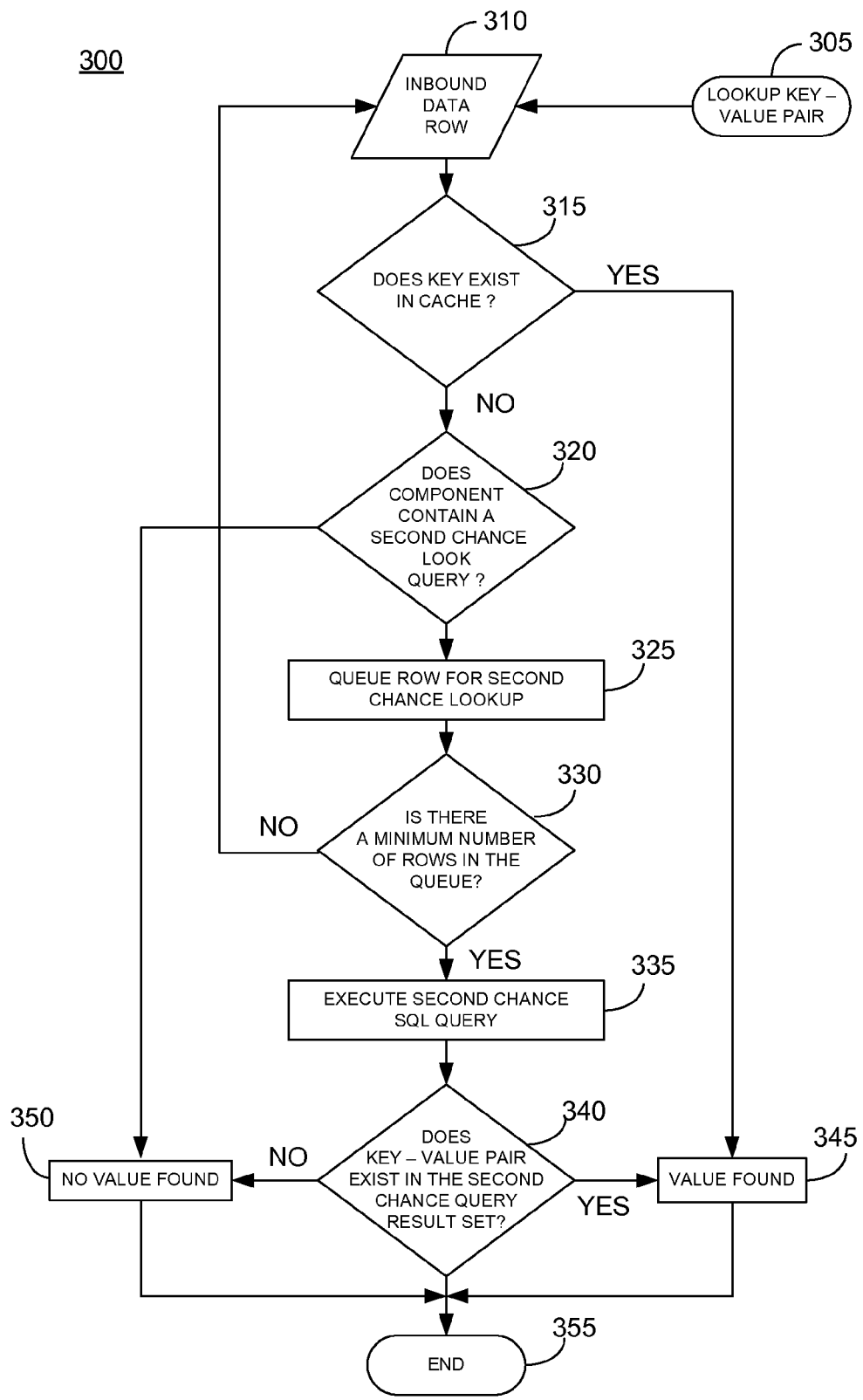
FIG. 3 is a flow diagram of another process, in accordance with some embodiments herein.

FIG. 3 relates to a process 300 for a cache lookup. At operation 305, an ETL process begins by looking up a key-value pair, and inbound data rows 310 are processed through an ETL cache lookup component of ETL process 115. In some embodiments, each inbound row has a key column that the ETL lookup component will attempt to find a matching value column in cache 120. Operation 315 determines whether the sought key is in cache 120.

If it is determined that a matching value column is found in the cache, then process 300 proceeds to operation 345. In some embodiments, the cache may be appended to the row. If the matching value is not found in the hash table of the cache, then process 300 may provide a second opportunity to locate a matching value.

If a matching value column (key) is not found in the cache, at operation 320 a determination is made whether the component contains a second chance look query. If not, then process 300 proceeds to operation 350 and terminates at 355. In the instance it is determined the component does contain a second look query process 300 continues to operation 325 and a row for the second chance lookup is queued. Further, a determination is made at 330 to check whether the minimum number of rows is in the queue. If not, then the process proceeds to process another inbound data row at operation 310. If the minimum number of rows is in the queue, then the second chance SQL component of the SQL statement is executed at 335.

After the second-chance SQL query is executed at operation 335, the result set is checked at operation 340 to determine whether the rows in the cache-miss queue have a matching value from the result set, i.e., whether the key-value pair exists in the second chance query result set. Thereafter, process 300 terminates at operation 355.

System 100 may include a database 105 in communication with a processor or processing engine, MES 110. In the example of system 100, database 105 may be any device, apparatus, or system capable of storing data or a persistence of data. Database 105 may include a hard disk drive, solid state memory devices, ROM, RAM, a database, and any other type of data storage mechanism capable of storing data.

In this regard, the various embodiments described herein can be employed in a wide variety of industries and operational facilities. Any industrial process with differing types of operations data may supply data to system 100 utilizing the invention. For instance, facilities involved with natural resource refinement and procurement, oil and gas procurement, oil and gas refinement, chemical synthesis and refinement, water treatment, power generation, power transmission, food and beverage processing, raw materials processing (e.g. pulp, lumber, metals, and minerals), agricultural processing and materials processing (e.g. steel mills and foundries) may be suited to utilize platforms and software built upon concepts described herein. Additionally, facilities involved in finished goods manufacturing and production such as product assembly lines may utilize one or more embodiments or systems with such features.

These facilities may have various assets, equipment, machinery, flows etc. that produce operations data which may be continuous or discrete and may involve operations data that is presented in batches. Examples include pumps, motors, tanks, pipelines, mills, lathes, mixers, assembly lines, and so on. Operations data may include data from machinery, assets, process historians, maintenance systems, enterprise resource planning systems and the like. Examples of such data include pressure, temperature, capacities, volumes, rates of flow, production totals, inventories, performance indicators and the like.

In some embodiments, the methods and systems disclosed herein may be implemented by a hardware only embodiment, a software only embodiment, and in some instances a combination of hardware and software components. In some aspects, the methods and systems may be accomplished, at least in part, using computing processors to execute computer code and program instructions stored on a memory (e.g., flash memory, RAM, ROM, disk drive, and other media) or otherwise accessible by the processor.

Embodiments described above are not intended to be limited to the specific form set forth herein, but are intended to cover such alternatives, modifications and equivalents as can reasonably be included within the spirit and scope of the appended claims.

What is claimed is:

1. A computer-implemented method for caching values during an extract transform load (ETL) process in a manufacturing execution system (MES), the method comprising:
    preloading a cache with a subset of a set of key-value pairs stored in source data, with a goal of achieving at least a predetermined cache hit ratio for any request of a particular key-value pair among the set stored in the source data;
    receiving a request of a key-value pair;
    determining whether the requested key-value pair is in the preloaded cache;
    if the requested key-value pair is in the preloaded cache, retrieving the requested key-value pair from the preloaded cache;
    if the requested key-value pair is not in the preloaded cache, queuing the requested key-value pair in an internal data structure until a threshold number of accumulated requested key-value pairs are queued in the internal data structure; and
    executing, in response to the internal data structure queue meeting the threshold number of accumulated requested key-value pairs, a query of the source data for all of the accumulated requested key-value pairs, and a command to retrieve all of the accumulated requested key-value pairs from the source data.

2. The method of claim 1, wherein the predetermined cache hit ratio is about 50%.

3. The method of claim 1, wherein the predetermined cache hit ratio is about 80%.

4. The method of claim 1, wherein the threshold number is 100.

5. The method of claim 1, wherein the cache is limited to storing a predetermined number of key-value pairs.

6. The method of claim 1, wherein the cache is initially preloaded with the most frequently used key-value pairs and wherein the cache replaces a least used key-value pair with a new frequently used key-value pair.

7. The method of claim 1, wherein the preloading of the cache comprises determining a predetermined number of key-value pairs that can be stored in the cache.

8. A medium having machine readable program instructions stored thereon, the instructions comprising:
    instructions to preload a cache with a subset of a set of key-value pairs stored in source data, with a goal of achieving at least a predetermined cache hit ratio for any request of a particular key-value pair among the set stored in the source data;
    instructions to receive a request of a key-value pair;
    instructions to determine whether the requested key-value pair is in the preloaded cache;
    instructions to retrieve the requested key-value from the preloaded cache if the requested key-value pair is in the preloaded cache;
    instructions to queue the requested key-value pair in an internal data structure, if the requested key-value pair is not in the preloaded cache, until a threshold number of accumulated requested key-value pairs are queued in the internal data structure; and
    instructions to execute, in response to the internal data structure queue meeting the threshold number of accumulated requested key-value pairs, a query of the source data for all of the accumulated requested key-value pairs, and a command to retrieve all of the accumulated requested key-value pairs from the source data.

9. The medium of claim 8, wherein the predetermined cache hit ratio is about 50%.

10. The medium of claim 8, wherein the predetermined cache hit ratio is about 80%.

11. The medium of claim 8, wherein the threshold number is 100.

12. The medium of claim 8, wherein the cache is limited to storing a predetermined number of key-value pairs.

13. The medium of claim 8, wherein the cache is initially preloaded with the most frequently used key-value pairs and replaces a least used key-value pair with a new frequently used key-value pair.

14. The medium of claim 8, wherein the preloading of the cache comprises determining a predetermined number of key-value pairs that can be stored in the cache.

15. A system comprising:

a first database; and an extract transform load (ETL) process of a manufacturing execution system (MES) to extract data from the first database, perform a transformation of the extracted data, and load the transformed data into the second database, wherein the ETL process operates to:

preload a cache of the MES with a subset of a set of key-value pairs stored in source data of the first database, with a goal of achieving at least a predetermined cache hit ratio for any request of a particular key-value pair among the set stored in the source data;

receive a request of a key-value pair;

determine whether the requested key-value pair is in the preloaded cache;

retrieve the requested key-value from the preloaded cache if the requested key-value pair is in the preloaded cache;

queue the requested key-value pair in an internal data structure of the MES, if the requested key-value pair is not in the preloaded cache, until a threshold number of accumulated requested key-value pairs are queued in the internal data structure; and execute, in response to the internal data structure queue meeting the threshold number of accumulated requested key-value pairs, a query of the source data of the first database for all of the accumulated requested key-value pairs, and a command to retrieve all of the accumulated requested key-value pairs from the source data.

16. The system of claim 15, wherein the predetermined cache hit rate is about 50%.

17. The system of claim 15, wherein the threshold number is about 100.

18. The system of claim 15, wherein the cache is limited to storing a predetermined number of key-value pairs.

19. The system of claim 15, wherein the cache is initially preloaded with the most frequently used key-values and replaces a least used key-value pair with a new frequently used key-value pair.

20. The system of claim 15, wherein the preloading of the cache comprises determining a predetermined number of key-value pairs that can be stored in the cache.

\* \* \* \* \*